May 27, 1958 E. P. YORK 2,836,064
REMOTE ROTATIONAL DISPLACEMENT INDICATORS
Filed April 24, 1957 2 Sheets-Sheet 1
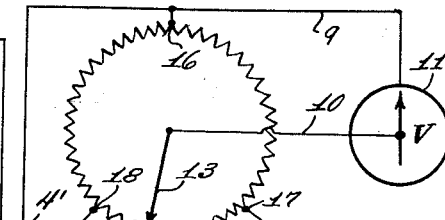
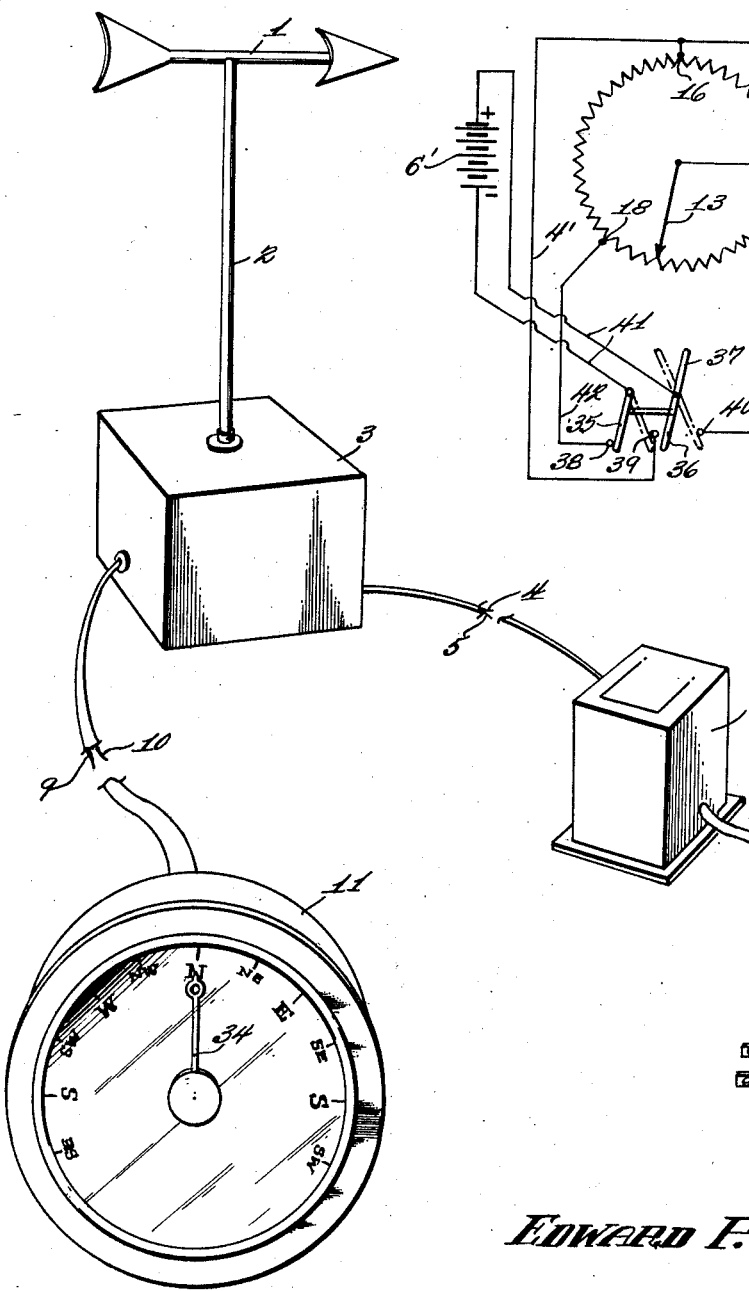
INVENTOR
EDWARD P. YORK,
BY
Stone & Mack
ATTORNEYS May 27, 1958  E. P. YORK  2,836,064
REMOTE ROTATIONAL DISPLACEMENT INDICATORS
Filed April 24, 1957  2 Sheets-Sheet 2
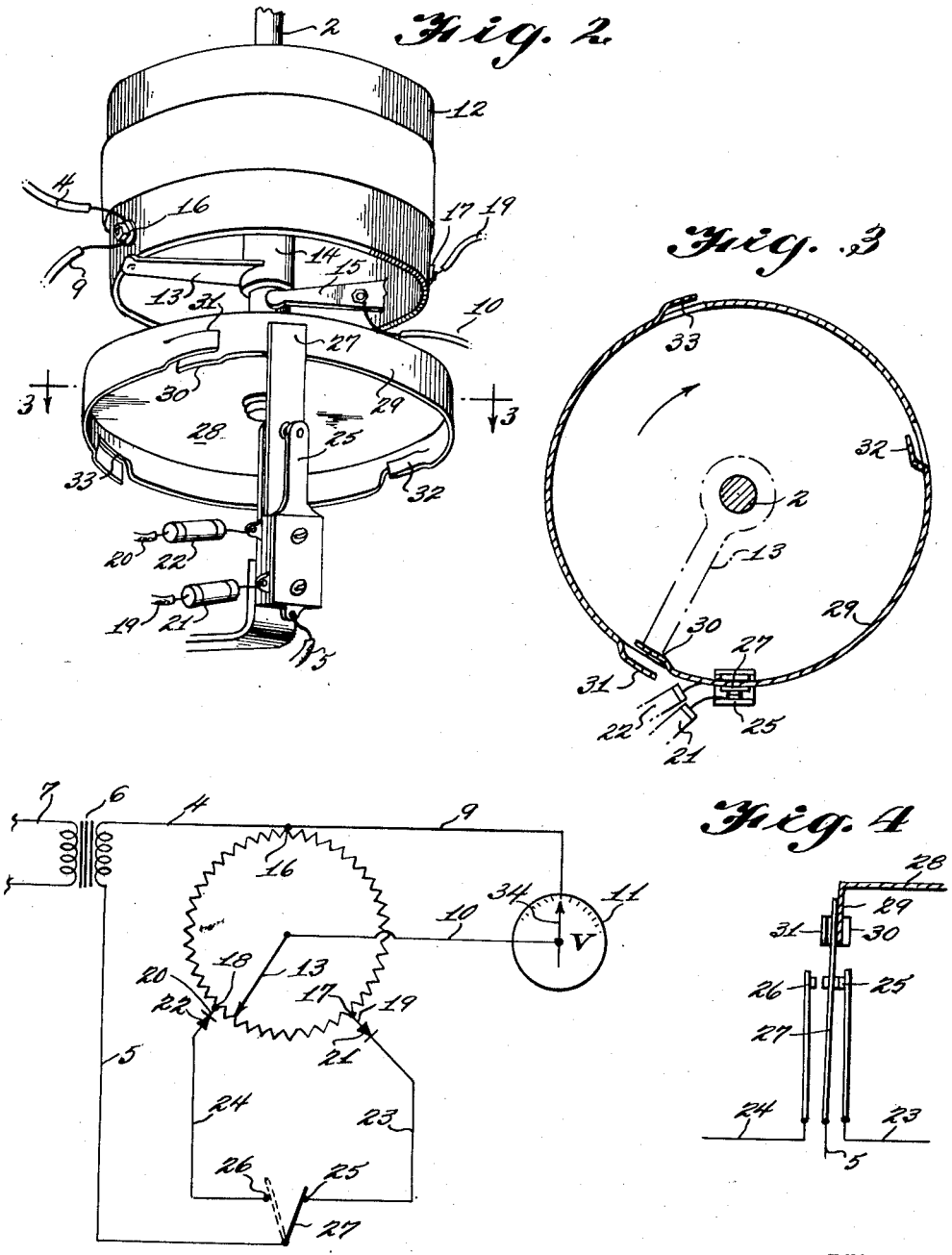
INVENTOR
EDWARD P. YORK
BY Stone & Mack
ATTORNEYS United States Patent Office 2,836,064
Patented May 27, 1958

2,836,064

REMOTE ROTATIONAL DISPLACEMENT INDICATORS

Edward P. York, Stonington, Conn.

Application April 24, 1957, Serial No. 654,712

11 Claims. (Cl. 73—188)

This invention relates to remote rotational displacement indicators, and more particularly to a remote wind direction indicator.

More specifically, the invention is directed to indicating systems designed to show all angular positions of a shaft adapted to rotate through 360°, by means of a meter of the center zero type having a pointer movable through not more than approximately 337°. An instrument well adapted to this purpose is the well known d'Arsonval direct current type of voltmeter.

In such an arrangement, in which the rotating shaft operates a potentiometer, it is, of course, necessary to provide a cross-over point. In the case of a wind direction indicator, due to the fact that the wind is continuously veering, if it is blowing about the cross-over point, the meter will jump from one extreme position to the other, without giving any accurate indication of the average position.

It is the general object of the present invention to overcome this difficulty, and to devise a system of the above mentioned nature which will give an accurate indication of all of the angular positions of the shaft operated by a weather vane or any other device, regardless of cross-over point.

To this end I provide a potentiometer having two cross-over or feed points, and equip the shaft with means for reversing the current to the meter under certain conditions as each feed point is passed. In addition, I provide the meter with an improved dial on which the same indications are duplicated at each end of the scale.

In order that the invention may be clearly understood, reference is had to the accompanying drawings, forming part of this specification, and in which:

Fig. 1 is a perspective view showing a complete remote wind direction indicator embodying the invention.

Fig. 2 is a fragmentary perspective view showing the potentiometer, the shaft of the weather vane and means associated therewith for operating my improved switch mechanism.

Fig. 3 is a horizontal section substantially on the line 3—3 of Fig. 2.

Fig. 4 is a fragmentary view, partly in section and partly in elevation, diagrammatically illustrating my improved switching means.

Fig. 5 is a circuit diagram showing the connections of the apparatus illustrated in Figs. 1 and 2; and Fig. 6 is a similar diagram showing a modified arrangement.

Although the invention is applicable for many other purposes, it will be described by way of illustration, and for the sake of simplicity, in connection with a remote wind direction indicator.

Referring to the drawings in detail, 1 indicates a weather vane of the usual type which is rigidly mounted on a vertical shaft 2 extending upwardly from a housing or cabinet 3. The apparatus is preferably operated at low voltage by means of a transformer 6 connected with the apparatus in the cabinet 3 by means of a cable including a pair of conductors 4 and 5, and from the transformer extends a cable 7 terminating in a plug 8 which may be inserted in any suitable alternating current receptacle.

The remote indications of the movements of the weather vane are given by a meter 11 connected with the cabinet 3 by means of a cable comprising a pair of conductors 9 and 10. This meter may be a center zero type of d'Arsonval voltmeter, and will be fully described later on.

The potentiometer comprises a cylindrical shell on which is wound a continuous coil 12, the convolutions of this coil extending axially. The shaft 2 extends centrally through this potentiometer and rigidly secured thereto as by means of a sleeve 14 is a wiper arm 13 which engages the lower edge of the convolutions of the potentiometer. The conductor 10, shown in Figs. 1 and 5, is connected with this wiper arm by means of a contact arm 15 bearing upon the shaft 2 and supported in any suitable way (not shown).

From a fixed point 16 of the potentiometer extend two conductors 4 and 9 as shown in Figs. 2 and 5, the conductor 9 extending to one side of the meter 11, the other side of meter being connected with the conductor 10. The conductor 4 extends to one side of the secondary of the transformer 6, the other side of this secondary being connected by conductor 5 with a selector switch 27, hereinafter more fully described.

In addition to the fixed point 16, of the potentiometer, to which one side of the transformer secondary is connected, I provide two spaced feed points 17 and 18, these feed points being preferably located approximately 135° and 225°, respectively from the point 16 when measured in a clockwise direction.

I provide a pair of oppositely arranged rectifiers 21 and 22, the rectifier 21 being connected with the feed point 17 by a conductor 19, and the rectifier 22 being connected with the feed point 18 by a conductor 20.

The selector switch, above referred to, comprises a switch member 27 movable between a pair of contacts 25 and 26, the contact 25 being connected by conductor 23 with the rectifier 21 and the contact 26 being connected by means of a conductor 24 with the rectifier 22.

Thus, when the switch member 27 is in the position shown in full lines in Fig. 5, current from the transformer flows through the rectifier 21 and is supplied to the potentiometer between the fixed point 16 and the feed point 17. When the switch is thrown to dotted line position, the current flows through rectifier 22 and feed point 18 in a reverse direction, since the rectifiers 21 and 22 are oppositely arranged. The voltage supplied to the meter is taken from the potentiometer between the fixed point 16 and whatever point the wiper arm 13 engages.

When the switch 27 is thrown from one position to the other, it will be noted that not only is the current supplied to the meter reversed, but its voltage is reduced. This is due to the fact that, in changing from one feed point to the other, the section of the potentiometer from which the voltage is taken off is changed.

In order to operate the selector switch 27 at the proper times, I have devised the mechanism shown in Figs. 2, 3 and 4. A disc 28 is rigidly secured to the weather vane shaft 2 and is formed with a down-turned peripheral rim 29, as best shown in Fig. 2. This rim is cut and bent in such a manner as to form a plurality of cam elements or tabs. At one point dual tabs 30 and 31 are formed, one projecting inwardly and the other outwardly, with a space between them. At other points, single tabs 32 and 33 are formed. One of these projects inwardly and the other outwardly, and they extend in opposite directions, as clearly shown in Figs. 2 and 3.

The spacing of these tabs around the disc 28 preferably corresponds with the spacing of the three points 16, 17 and 18, in Fig. 5. That is to say, the tabs 32 and 33 are spaced respectively 135° and 225° from the dual tabs 30, 31 when measured in a counter-clockwise direction as viewed in Fig. 3. Furthermore, it will be noted that the dual tabs 30, 31 are in substantial vertical alignment with the wiper arm 13.

The upper end of the switch member 27 is of such length as to overlap the flange 29 and is so positioned as to lie within the path of movement of the several tabs above described. It will be understood that the switch member 27 is of the well known toggle or snap type so that when moved laterally, as viewed in Fig. 4, after it has been forced just beyond the midway point, it will snap over or travel of its own accord from a position in which it engages one of the contacts 25, 26 into a position in which it engages the other of these contacts, and will remain in such position until again moved laterally.

Thus, from an inspection of Figs. 2 and 3, it will be seen that when the dual tabs 30 and 31 pass the switch member 27, they will serve to shift this switch member from a position on one side of the rim 29 to a position on the other side thereof, the switch member passing through the space between the two tabs. It will further be noted that this shifting of the switch member by the dual tabs 30, 31 takes place when the disc 28 is moving in either direction. The single tabs 32 and 33, on the contrary, operate to move the switch member 27 only when moving in a certain direction. Thus, the tab 32 will move the switch member when the shaft and disc are turning in one direction, and the tab 33 will serve to shift the switch member only when the shaft and disc are turning in the other direction.

In practical operation, it is convenient to place the dual tabs 30, 31 at a point corresponding with the "North" position of the weather vane so that each time the weather vane passes through this "North" position in either direction the switch member 27 is moved.

Referring again to Fig. 1, an important feature of the invention resides in the novel scale arrangement of the meter 11. The central zero position of the pointer 34 is taken as one of the cardinal points of the compass such as "North." On one side of this "North" position the scale reads successively "NE," "E," "SE," and "S," and on the other side the scale reads "NW," "W," "SW," and "S." Thus, the reading is duplicated at each end of the scale or, in other words, one cardinal point of the compass is at the central zero position and the other opposite cardinal point of the compass is adjacent each end of the scale, and is duplicated at both ends. While the two "South" marks are shown in the drawing as being 180° apart, it will be understood that the exact angular length of the scale is unimportant so long as it is less than 337°.

Another novel feature of my improved scale consists in the fact that beyond the "South" mark at each end of the scale I place an additional mark indicating the next intermediate point of the compass. Thus, beyond the point "South" at the righthand side of the meter I place the notation "Southwest," and beyond the point "South" on the lefthand side of the meter I place the notation "Southeast." Thus, it will be noted that, as shown, the two notations "Southwest" are diametrically in line, and the two notations "Southeast" are diametrically in line, one of these notations at each side of the meter being below the mark "South" and the other being above it.

The operation of the device will now be briefly described. Assuming that the vane is pointing "North" and that the wind then veers toward the "East," the wiper arm 13 will move over the potentiometer in such a manner as to cause the pointer 34 of the meter to move toward the righthand side as viewed in Fig. 1. It will be assumed that the wind continues to shift through "Southeast" to "South" and beyond "South" toward the "Southwest." Just before the pointer 34 reaches the notation "Southwest," the tab 33 will move the switch member 27 and shift it out of engagement with one of the contacts 25 or 26 into engagement with the other, thus reversing the direction of current through the meter. The pointer will thereupon swing quickly from the righthand side of the scale over to the lefthand side. Owing to the fact however, that, as above explained, the voltage is reduced at the same time that the current is reversed, the pointer will come to rest near the notation "Southwest" at the lefthand side which is located between the "North" and "South" notations and thus lies within what may be termed a "safe" area of the meter. In this manner the difficulty heretofore encountered on account of the wiper arm moving past the cross-over point is eliminated and the meter continues to accurately indicate the true wind direction.

If, after reaching "South" or "Southwest" at the lefthand side of the meter, the wind should again veer back toward the "Southeast," the pointer 34 will move toward "Southeast" at the lefthand side of the meter and one of the tabs will then again throw the switch and the pointer will immediately swing over to the "Southeast" indication at the righthand side of the meter.

While I have so far described the invention as employing alternating current and a pair of reversely arranged rectifiers, it is also possible, and in some cases desirable, to employ a source of direct current such as a battery. This is illustrated in Fig. 6 in which 6' designates the battery. In this modification, I employ a reversing switch comprising a pair of pivoted, mechanically connected switch members 35 and 36, the member 36 being extended as at 37 so as to be in a position to be engaged by the tabs. The switch members 35, 36 are constructed to selectively engage contacts 38, 39 and 40, the contact 38 being connected by conductor 42 with the feed point 18 and the contact 40 being connected by means of a conductor 43 with the feed point 17. The contact 39 is connected by conductor 4' with the fixed point 16 and the two sides of the battery are connected by conductors 41 to the switch members 35 and 36.

The operation is substantially the same, the throwing of the switch members 35, 36 from one position to the other serving to reverse the polarity of the battery relative to the potentiometer, and serving at the same time to change the connections from one feed point to the other.

This modification, employing a battery, would be desirable for use on boats, for example, where alternating current is not ordinarily available.

While I have shown and described a center zero type of indicating instrument for showing 360° of rotation, it will of course be understood that a similar type of recording instrument may be employed if desired. In such an instrument, a pen would be carried by the pointer 34, and this would produce an irregular line on a longitudinally moving strip or band. The invention is particularly well adapted for recording 360° rotation in this manner.

When in the claims I use the term "indicating," it will be understod that I intend this term to include recording, also; and where in the claims I use the term "center zero type meter," I mean to include a center zero type of recording instrument.

What I claim is:

1. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, means for supplying current to said potentiometer between said fixed point and either one of two spaced feed points, and means operated by said shaft for changing the connection from one of said feed points to the other and for simultaneously reversing the direction of current.

2. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, means for supplying current to said potentiometer between said fixed point and either one of two spaced feed points, and means operated by said shaft for changing the connection from one feed point to the other and for reversing the direction of current whenever said wiper arm passes said fixed point in either direction.

3. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, means for supplying current to said potentiometer between said fixed point and either one of two spaced feed points, switching means which, when actuated, changes the connection from one feed point to the other and simultaneously reverses the direction of current, means operated by said shaft for actuating said switching means whenever said wiper arm passes said fixed point in either direction, and means operated by said shaft, when moving in one direction, for actuating said switching means when the wiper arm passes one of said feed points, and when moving in the opposite direction, for actuating said switching means when the wiper arm passes the other feed point.

4. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, means for supplying current to said potentiometer between said fixed point and either one of two spaced feed points, and means operated by said shaft for shifting the connection from one feed point to the other, and for simultaneously reversing the direction and reducing the voltage of the current supplied to said meter.

5. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, means for supplying current to said potentiometer between said fixed point and either one of two spaced feed points, switching means which, when actuated, changes the connection from one feed point to the other and simultaneously reverses the direction of current and reduces the voltage supplied to said meter, means operated by said shaft, when turning in one direction, for actuating said switching means when the wiper arm passes one of said feed points, and when turning in the opposite direction, for actuating said switching means when the wiper arm passes the other of said feed points.

6. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, means for supplying current to said potentiometer between said fixed point and either one of two spaced feed points, said means comprising a transformer having one side connected with said fixed point and the other side, through a selector switch, with said feed points, reversely arranged rectifiers included in the connections between said feed points and said selector switch, and means operated by said shaft as it rotates for actuating said selector switch.

7. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, means for supplying current to said potentiometer between said fixed point and either one of two spaced feed points, said means comprising a transformer having one side connected with said fixed point and the other side, through a selector switch, with said feed points, reversely arranged rectifiers included in the connections between said feed points and said selector switch, and means operated by said shaft as it rotates for actuating said selector switch when the wiper arm passes said feed points, whereby the direction of the current supplied to said meter is reversed.

8. In an electrical indicating system, the combination with a circular potentiometer, of a shaft rotatable through 360° in either direction and carrying a wiper arm engaging said potentiometer, a center zero type meter connected with said wiper arm and with a fixed point on said potentiometer, a battery for supplying current to said potentiometer between said fixed point and either one of two spaced feed points, a reversing switch interposed between said battery and said potentiometer, said switch serving, when actuated, not only to reverse the direction of current but also to simultaneously change the connection from one of said feed points to the other, and means operated by said shaft as it rotates in either direction for actuating said switch at certain angular positions of the shaft.

9. In an electric indicating system, the combination with a shaft adapted to rotate through 360° in either direction, of a circular potentiometer, a wiper arm carried by said shaft, and arranged to engage said potentiometer, a center zero type of voltmeter connected to said arm and to a fixed point on said potentiometer, means for supplying uni-directional current to said potentiometer between said fixed point and either one of two spaced feed points, and means operated by said shaft when said wiper arm passes a feed point for changing the connection from one feed point to the other and for simultaneously reversing the direction of the current supplied, said meter having a scale extending less than 360° and said scale being duplicated at each end, whereby when the feed point is changed, and the current reversed, the meter pointer will swing for one end of the scale to the opposite end, but will momentarily give the same indication at such opposite end.

10. In a remote wind direction indicator, the combination with a weather vane, of a shaft rotatable in either direction on which said vane is rigidly mounted, a circular potentiometer, a wiper arm carried by said shaft and engaging said potentiometer, a center zero type of voltmeter connected to said arm and to a fixed point on said potentiometer, means for supplying uni-directional current to said potentiometer between said fixed point and either one of two spaced feed points, and means operated by said shaft when said wiper arm passes a feed point for changing the connection from one feed point to the other and for simultaneously reversing the direction of the current supplied to the meter and reducing its voltage, said meter having a scale with one of the cardinal points of the compass at the central zero position and the opposite cardinal point of the compass adjacent each end of the scale, said scale being extended to show one additional intermediate point of the compass at each extreme end beyond said opposite cardinal point, whereby, when the feed point is changed and the current reversed, the meter pointer will swing from the additional intermediate point of the compass at one end of the scale to the same intermediate point of the compass adjacent the other end of the scale.

11. In a remote wind direction indicator, the combination with a weather vane, of a shaft rotatable in either direction on which said vane is rigidly mounted, a circular potentiometer, a wiper arm carried by said shaft and engaging said potentiometer, a center zero type of voltmeter connected to said arm and to a fixed point on said potentiometer, means for supplying unidirectional current to said potentiometer between said fixed point and either one of two spaced feed points, and means operated by said shaft when said wiper arm passes a feed point for changing the connection from one feed point to the other and for simultaneously reversing the direction of the current supplied to the meter and reducing its voltage, said meter having a scale with "North" at the central zero position and "South" adjacent each end thereof, and with "Southwest" beyond "South" at one extreme end and "Southeast" beyond "South" at the other extreme end thereof, whereby, when the feed point is changed and the current reversed when the pointer approaches "Southwest" the pointer will swing from that end of the scale to the "Southwest" position at the other side of the scale, and when the pointer approaches "Southeast" at the opposite end of the scale, it will swing from that end to the "Southeast" position at the other side of the scale.

References Cited in the file of this patent

UNITED STATES PATENTS 2,770,129     Dalzell _____ Nov. 13, 1956